US012258985B2

(12) United States Patent
Auston

(10) Patent No.: US 12,258,985 B2
(45) Date of Patent: Mar. 25, 2025

(54) ANCHOR

(71) Applicant: SafeHold Limited, Kent (GB)

(72) Inventor: Oliver Auston, Kent (GB)

(73) Assignee: SafeHold Limited, Kent (GB)

( * ) Notice: Subject to any disclaimer, the term of this patent is extended or adjusted under 35 U.S.C. 154(b) by 279 days.

(21) Appl. No.: 17/891,274

(22) Filed: Aug. 19, 2022

(65) Prior Publication Data
US 2023/0313826 A1 Oct. 5, 2023

(30) Foreign Application Priority Data

Apr. 5, 2022 (GB) ..................................... 2204991

(51) Int. Cl.
*F16B 13/08* (2006.01)
(52) U.S. Cl.
CPC ................................ *F16B 13/0891* (2013.01)
(58) Field of Classification Search
CPC ........................... F16B 13/0891; F16B 19/109
USPC .................................................... 411/80, 347
See application file for complete search history.

(56) References Cited

U.S. PATENT DOCUMENTS

| | | | | |
|---|---|---|---|---|
| 2,896,494 A | * | 7/1959 | Lerick ................. | F16B 13/0891 411/76 |
| 3,478,641 A | * | 11/1969 | Dohmeier ........... | F16B 13/0891 411/79 |
| 4,506,924 A | * | 3/1985 | Nieder ..................... | B66C 1/54 294/96 |
| 6,729,821 B2 | | 5/2004 | Guthrie et al. | |
| 7,011,281 B2 | | 3/2006 | Guthrie et al. | |
| 7,258,316 B2 | | 8/2007 | Reeves | |
| 7,357,363 B2 | | 4/2008 | Guthrie et al. | |
| 8,839,591 B2 | * | 9/2014 | Guthrie ............... | E04G 21/3276 248/231.91 |
| 9,163,651 B2 | | 10/2015 | Ostrobrod | |
| 9,255,594 B2 | * | 2/2016 | Cabrit ..................... | F16B 13/00 |
| 10,478,645 B2 | * | 11/2019 | Maurice ............... | A63B 29/024 |

(Continued)

FOREIGN PATENT DOCUMENTS

TW M613170 U 6/2021

*Primary Examiner* — Flemming Saether
(74) *Attorney, Agent, or Firm* — Billion & Armitage

(57) ABSTRACT

An anchor for insertion into an aperture, wherein the anchor includes a body element, two or more elongate engagement members, and a release element. The body element has a first end and an opposed second end, and the body element defines a tapered surface adjacent to a first end portion of the body element. The release element is slidably coupled to the body element. Each of the engagement members has a first end via which the engagement member is coupled to the release element, and a second end which includes a radially outwardly projecting lug. The second ends of the engagement members engage the tapered surface defined by the body element. When the release element is in a release position relative to the body element, the second ends of the engagement members are engaged with a relatively narrow portion of the tapered surface and the lugs are in a radially contracted configuration. When the release element is in an engaged position relative to the body portion, the second ends of the engagement members are engaged with a relatively wide portion of the tapered surface and the lugs are urged radially outwards from the body element by the tapered surface to form a radially expanded configuration.

10 Claims, 4 Drawing Sheets

(56) References Cited

U.S. PATENT DOCUMENTS

| | | | |
|---|---|---|---|
| 11,446,526 B2* | 9/2022 | Guthrie | F16B 13/0891 |
| 2009/0056267 A1* | 3/2009 | Reeves | A62B 1/04 52/699 |

* cited by examiner

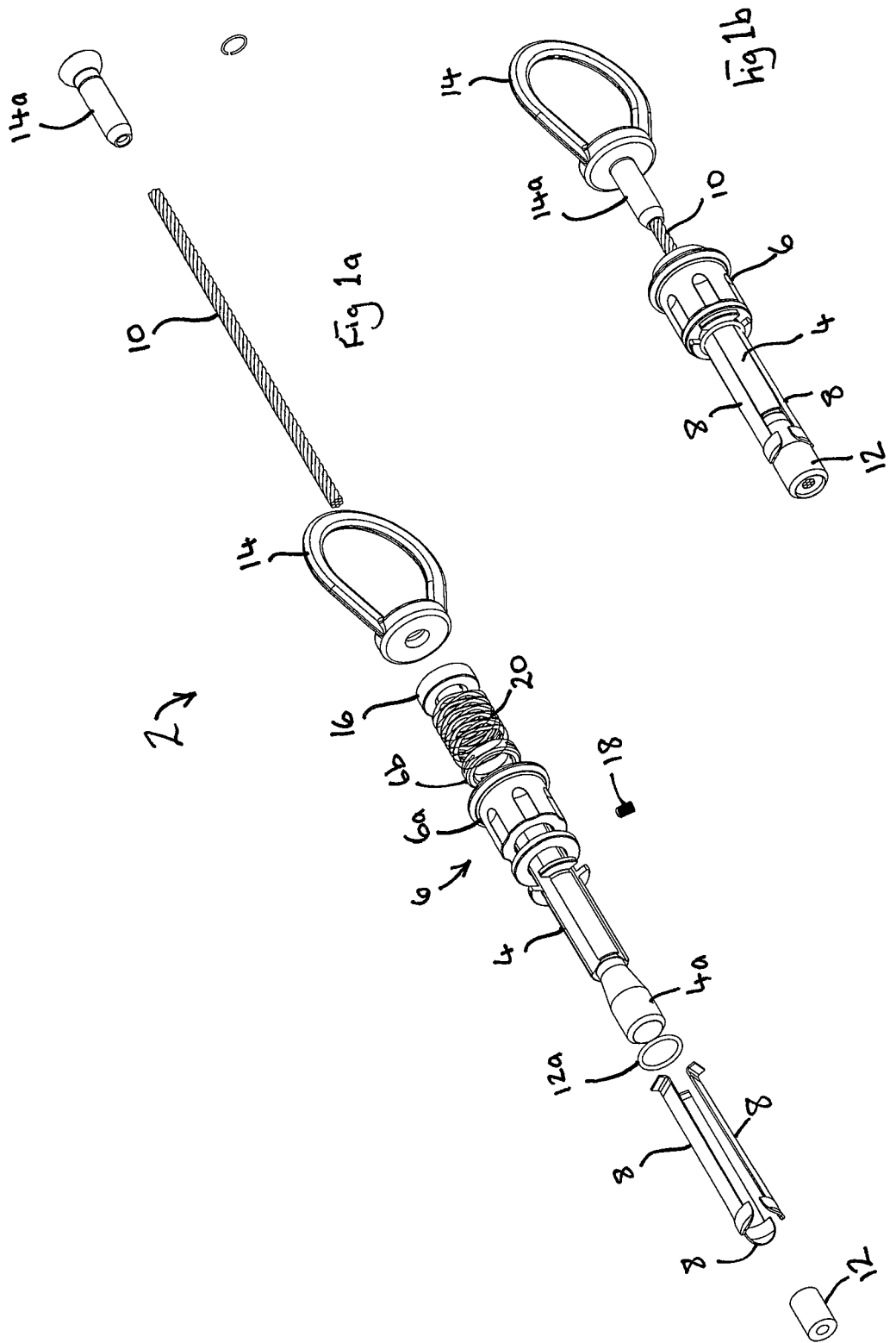

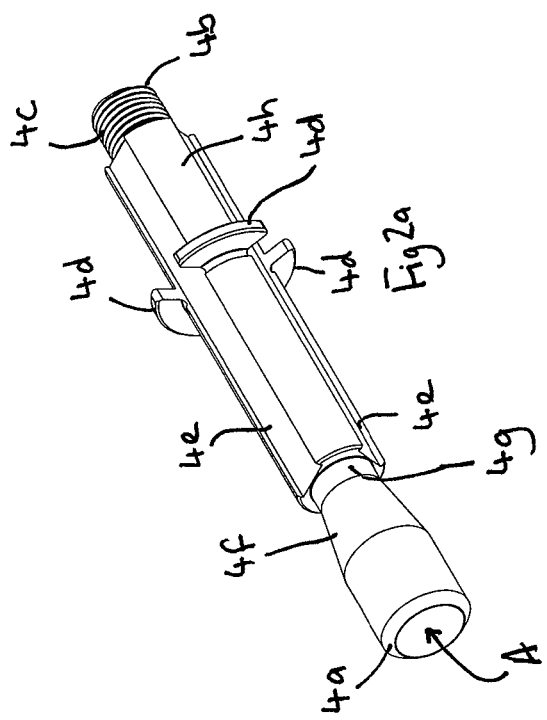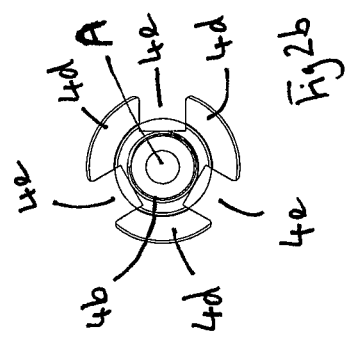

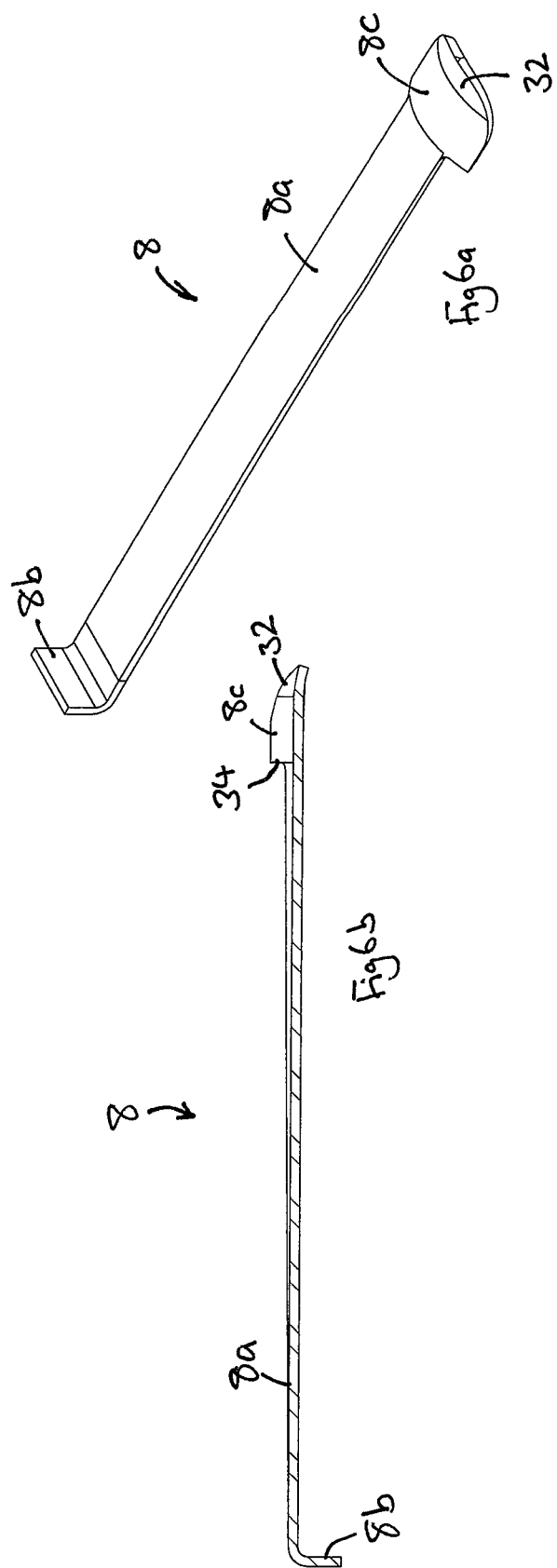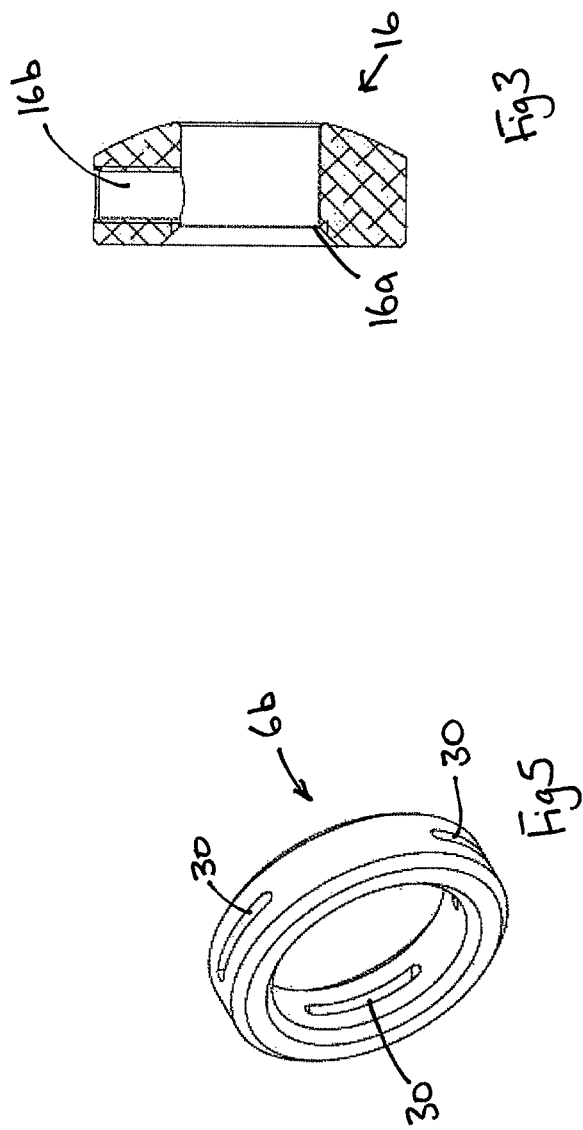

ANCHOR

FIELD OF THE INVENTION

The present invention relates to an anchor for use in apertures, such as holes drilled into a solid substrate.

BACKGROUND OF THE INVENTION

Removeable anchors for use in apertures are known and examples of such anchors are described in U.S. Pat. Nos. 6,729,821 and 7,258,316. Typically, such anchors comprise a tapered inner element and a number of outer elements which engage the inner element to provide a contracted configuration of the outer elements or a radially expanded configuration. In the expanded configuration, the outer elements engage an inwardly-facing surface of the aperture in which the anchor is located, which prevents the removal of the anchor from the aperture.

In the known anchors, the outer elements are typically controlled by cables. However, this adds to the complexity of the anchor and makes it more expensive to manufacture and assemble.

The present invention seeks to provide a simpler anchor.

SUMMARY OF THE INVENTION

According to a first aspect of the invention, there is provided an anchor for insertion into an aperture, the anchor comprising a body element, two or more elongate engagement members, and a release element; wherein the body element has a first end and an opposed second end; the body element defines a tapered surface adjacent to a first end portion of the body element; the release element is slidably coupled to the body element; each of the engagement members has a first end via which the engagement member is coupled to the release element, and a second end which includes a radially outwardly projecting lug; the second ends of the engagement members engage the tapered surface defined by the body element; and wherein when the release element is in a release position relative to the body element, the second ends of the engagement members are engaged with a relatively narrow portion of the tapered surface and the lugs are in a radially contracted configuration; and when the release element is in an engaged position relative to the body portion, the second ends of the engagement members are engaged with a relatively wide portion of the tapered surface and the lugs are urged radially outwards from the body element by the tapered surface to form a radially expanded configuration.

It will be appreciated that the anchor comprises three essential components: the body element which defines the tapered surface and which suitably also defines a surface relative to which the release element may move; the release element which slides relative to a portion of the body element; and two or more engagement members. The engagement members are suitably coupled directly to the release element via their first ends and the opposite end of the engagements members carries a radially outwardly projecting lug. In use, each lug engages an inwardly-facing surface of the aperture. The use of such engagement members avoids the need for operating cables and simplifies the anchor.

The body element suitably defines a longitudinal axis and the release element suitably slides axially relative to the longitudinal axis of the body element. For example, the release element may slide towards or away from the first end of the body element. In order to slidably couple the release element to the body element such that it slides axially relative to the body element, the release element may define a central bore and a portion of the body element may be located within the central bore. For example, the release element may be a substantially cylindrical element.

When the release element is in its release position relative to the body element, the engagement members may be arranged substantially adjacent the body element, for example, parallel to an outer surface of the body element.

In an embodiment of the invention as defined herein, the release element is biased to its engaged position relative to the body element. For example, the anchor may include a biasing element, such as a spring, which urges the release element towards its engaged position relative to the body element. Thus, the biasing element may engage or act upon the release element, either directly or indirectly.

Suitably, each engagement member may comprise a resiliently deformable body. In the context of the present invention, the term "resiliently deformable" means that the body is deflectable, for example, it may be deflectable in a transverse direction relative to the longitudinal axis of the engagement member. Thus, the body may be in the form of a deflectable bar or rod.

In a further embodiment of the invention, each of the engagement members defines at one end thereof a release element coupling portion, and carries the lug at the opposite end thereof. Thus, each engagement member may be coupled to the release element via the release element coupling portion. For example, the release element coupling element portion may be in the form of a hook which may be received by a complementary aperture defined by the release element.

The displacement of the release element relative to the body element may be constrained. For example, the body element may define a first stop element and a spaced apart second stop element, wherein the displacement of the release element relative to the body element is constrained by the first and second stop elements. As noted above, the release element may slide axially relative to the body element. Thus, the first and second stop elements may be axially spaced apart and the axial displacement of the release element may be constrained.

In an embodiment of the invention, the body element defines therein a central bore; and a load cable extends through the body element central bore. Suitably, one end of the load cable includes a cable crimp and the cable crimp is disposed adjacent to the first end of the body element. For example, the cable crimp may engage the first end of the body element.

It will be appreciated that in such an arrangement, the load cable may be anchored by the anchor and the load cable may support a load. Accordingly, the opposite end of the load cable may include a coupling to which a load may be attached.

In a further embodiment of the invention, a width dimension of the tapered surface decreases in the direction of the second end of the body element such that the body element defines a waist portion at one end of the tapered surface. In other words, the tapered surface tapers inwards as it extends towards the second end of the body element. Accordingly, a waist may be disposed between the first and second ends of the body element. In such embodiments, the second ends of engagement members may be aligned with/engage the waist portion of the body element when release element is in its release position. Such an arrangement permits the radially inward contraction of the second ends of the engagement members. The skilled person will appreciate that in such embodiments, displacement of the release element axially towards the second end of the body element will contract the engagement members. This may permit the release the anchor from the aperture. Conversely, displacement of the release element towards the first end of the body element will urge the second ends of the engagement members radially outwards into their engagement configuration. In such a configuration, the anchor may be retained within the aperture.

The tapered surface is suitably defined by a frustoconical or trumpet shaped portion of the body element. Such an arrangement permits the engagement members to be displaced radially by the same distance as the release element is displaced axially relative to the body element. This in turn permits a substantially equal engagement force to be exerted by each of the engagement members.

It may be desired to urge the lugs out of engagement with an aperture surface when the release element is position in its release position. Accordingly, each engagement member body may be resiliently deformable and may be deflected radially outwards when the release element is in its engaged position and the lugs are in their radially expanded configuration. In other words, the first end of the engagement members may remain fixed relative to the release element as the second ends of the engagement members are urged radially outwards by the tapered surface. Thus, the engagement member bodies may adopt a curved configuration. In this configuration, the resiliently deformable body of each engagement member suitably stores energy which may be converted to a restorative force which in turn may urge the lugs into their radially contracted configuration when the release element is moved to its release position.

In an embodiment of the invention, the anchor includes three or four engagement members; the release element is substantially cylindrical; and the engagement elements are circumferentially spaced around the cylindrical release element. The substantially equal circumferential spacing permits the load supported by the anchor to be evenly spread.

In a yet further embodiment of the invention, the body defines a plurality of longitudinal channels and the engagement members are disposed within respective channels when the release element is in its release position and the engagement member lugs are in their radially contracted configuration. By locating the engagement members within respective longitudinal channels when the release element is in its release position and the engagement member lugs are in their radially contracted configuration minimises the radial profile of the anchor, which makes it easier to insert into a respective aperture formed in a substrate. For example, the body element may have a maximum radial dimension and the radial projection of the lugs in their radially contracted configuration is suitably less that the maximum radial dimension of the body element. Thus, the lugs in their radially contracted configuration may be located within the radial footprint of the body element.

The skilled person will appreciate that the features described and defined in connection with the aspects of the invention and the embodiments thereof may be combined in any combination, regardless of whether the specific combination is expressly mentioned herein. Thus, all such combinations are considered to be made available to the skilled person.

BRIEF DESCRIPTION OF THE DRAWINGS

An embodiment of the invention will now be described, by way of example only, with reference to the accompanying drawings in which:

FIG. 1a shows an exploded view of an anchor according to the invention;

FIG. 1b shows a perspective view of the anchor shown in FIG. 1a with the release element in its engaged position;

FIG. 2a shows a perspective view of the body element that forms part of the anchor shown in FIGS. 1a and 1b;

FIG. 2b shows an end view of the body element shown in FIG. 2a;

FIG. 3 shows a cross-sectional view through the end cap shown in FIG. 1a;

FIG. 4a shows a perspective view of the main body part of the release element shown in FIG. 1a;

FIG. 4b shows a cross-sectional view through the main body part of the release element shown in FIG. 4a;

FIG. 5 shows a perspective view through of a tab collar which forms part of the release element shown in FIGS. 4a and 4b;

FIG. 6a shows a perspective view of one of the engagement members shown in FIG. 1a; and FIG. 6b shows a cross-section through the engagement member shown in FIG. 6a.

DETAILED DESCRIPTION

Figure 4A:
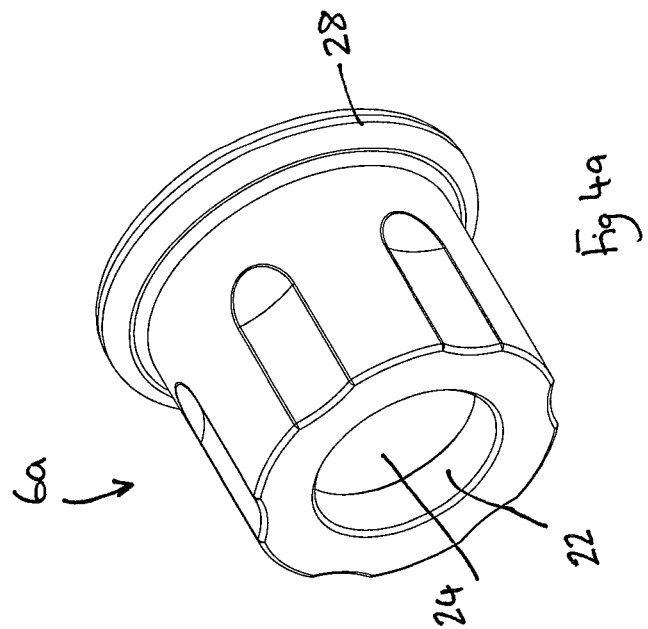

For the avoidance of doubt, the skilled person will appreciate that in this specification, the terms "up", "down", "front", "rear", "upper", "lower", "width", etc. refer to the orientation of the components as found in the example when installed for normal use as shown in the Figures.

FIGS. 1a and 1b show views of an anchor 2 according to the invention.

The anchor 2 comprises a main body element 4 which is shown in more detail in FIGS. 2a and 2b. It also comprises a release element 6 slidably coupled to the main body element 4. The release element 6 has coupled thereto three engagement members 8.

The anchor 2 further comprises a load cable 10. At one end of the load cable 10 is fixed a cable crimp 12. As shown in FIG. 1b, the cable crimp 12 abuts a first end 4a of the main body element 4. The first end 4a of the main body element 4 is sealed against the ingress of contaminants by an O-ring seal 12a which is located between the cable crimp 12 and the first end 4a of the main body element 4. At the opposite end of the load cable 10 is a conventional D-ring 14, which is fixed to the load cable 10 via a D-ring crimp 14a.

As shown in FIG. 2a, a second end 4b of the main body element 4 defines a screw thread 4c. Additionally, a central portion of the main body element 4 carries a first stop element 4d. Finally, the main body element 4 defines three circumferentially spaced axial channels 4e, which will be discussed in more detail below.

The main body element 4 further includes a frustoconical portion 4f adjacent to the first end 4a of the main body element 4. As can be seen from FIG. 2, the diameter of the frustoconical section decreases from its distal end (i.e. adjacent to the first end 4a of the main body element 4) to its proximal end. This arrangement defines a waist portion 4g disposed between the first end 4a and the second end 4b of the main body element 4.

The main body element 4 defines therethrough a bore A, through which the load cable 10 passes.

Returning to FIGS. 1a and 1b, it can be seen that an end cap 16 (shown in more detail in FIG. 3) is screwed onto the screw thread 4c defined by the main body element 4. The end cap 16 is further secured to the main body element 4 via a grub screw 18. Thus, the end cap 16 is cylindrical and the inwardly facing surface of the end cap body carries a helical thread 16a which is complementary to the screw thread 4c carried by the main body element 4. Furthermore, the end cap body defines a threaded bore 16b within which is threadedly engaged the grub screw 18.

The end cap 16 defines a second stop element. The release element 6 is capable of axial displacement relative to the main body element 4 between the first stop element 4d and the second stop element defined by the end cap 16.

A spring 20 is disposed between the end cap 16 and a first end of the release element 6. The spring 20 biases the release element 6 towards the first stop element 4d.

Figure 4B:
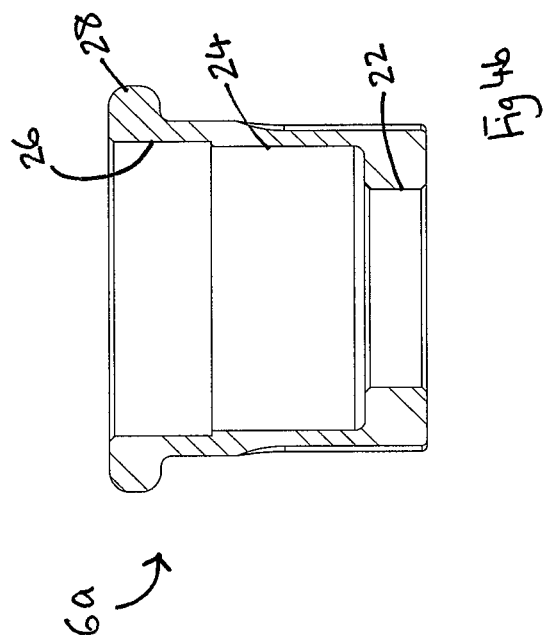

FIGS. 4a, 4b and 5 show a release element body 6a and a corresponding tab collar 6b which together form the release element 6. The release element body 6a is substantially cylindrical in shape. The internal diameter of the release element body defines three stepped portions: a first portion 22 defines a diameter which allows it to receive therein a bearing portion 4h of the main body element 4; a second portion 24 which has a diameter that is greater than the diameter of the first portion 22; and a third portion 26 which receives therein the tab collar 6b. The tab collar 6b forms a friction fit within the third portion 26.

The release element body 6a further defines a flange 28 which a user is able to grasp in order to urge the release element body 6a towards the end cap 16 against the biasing force exerted by the spring 20.

The tab collar 6b is also a formed from a cylindrical body. The tab collar 6b defines three circumferentially spaced apertures 30 within its body.

FIGS. 6a and 6b show one of the engagement members 8. The engagement member 8 comprises an elongate body 8a which is angled at one end thereof to form a transverse locating tabs 8b. Each of the transverse locating tabs 8b is received within a respective one of the circumferentially spaced apertures 30 defined by the tab collar 6b.

At the opposite end of the elongate body 8a is a radially outwardly projecting lug 8c which has a curved outwardly facing surface. The distal end of the lug 8c includes a tapered leading edge 32 and a rearwardly facing shoulder 34 which in use will engage the inwardly-facing surface of the aperture and resist removal of the anchor 2 from the aperture.

An assembled anchor 2 is shown in FIG. 1b. The anchor is assembled as follows: each of the three engagement members 8 are located in respective axial channels 4e with the transverse locating tabs 8b of the engagement members 8 being located with respective apertures 30 defined by the tab collar 6b. The tab collar 6b is then urged into the annular channel defined between the bearing portion 4h of the main body element 4 and the third portion 26 of the release element body 6a, where it forms a friction fit with the release element body 6a.

The spring 20 is then located over the bearing portion 4h of the main body element 4, with one end of the spring 20 in contact with the tab collar 6b. The end cap 16 is then screwed onto the threaded portion 4c of the main body element 4 and secured in place with the grub screw 18. With the spring 20 and end cap 16 in place, the release element 6 is urged towards the first stop element 4d, as shown in FIG. 1b. In this configuration, the lugs 8c contact the widest part of the frustoconical portion 4f of the main body element 4 and are urged radially outwards such that the curved outwardly-facing surfaces of the lugs 8c project radially outwards beyond the main body element 4, i.e. the lugs 8c are in a radially expanded configuration when the release element 6 is positioned against the first stop element 4d.

As end of the elongate body 8a which is adjacent to the transverse locating element 8b is radially fixed relative to the main body element 4 by the tab collar 6b and the release element body 6a and the opposite end of the elongate body 8a (i.e. the end adjacent to the lugs 8c) is deflected outwards, the elongate body adopts a slightly curved arrangement and a restorative force is stored in the elongate body 8a.

In order to radially contract the lugs 8c such that the anchor 2 can be inserted into an aperture formed in a substrate, a user grasps the release element body 6a and urges it rearwards towards the end cap 16 against the biasing force of the spring 20. This moves the engagement members 8 rearwards until the lugs 8c are aligned with the waist portion 4g. In this configuration, the elongate body 8a of each of the engagement members 8 is entirely retained within the respective axial channels 4e of the main body element 4 and the lugs are in a radially contracted configuration. The lugs are urged into the radially contracted configuration by the restorative force stored in the elongate body 8a. In such an arrangement, the lugs 8c are contained within the radial footprint of the main body element 4.

Finally, the cable crimp 12 is fixed to one end of the load cable 10 and the O-ring 12a is coupled to the first end 4a of the main body element 4. The other end of the load cable 10 is then passed through the aperture defined within the main body element and projects beyond the second end 4b of the main body element. The D-ring 14 is then secured to the other end of the load cable 10 by the D-ring crimp 14a in a conventional way.

In use, the release element 6 is urged rearwards to radially contract the engagement member lugs 8c. The anchor 2 is then inserted into a suitably sized aperture formed in a substrate. Once the anchor 2 is fully located within the aperture, the release element 6 is released, whereupon the spring 20 urges the release element forwards, which in turn displaces the engagement members 8 forwards. The tapered surface of the frustoconical portion 4f urges the lugs 8c radially outwards until the engage an inwardly-facing surface of the aperture. The shoulders 34 of the lugs 8c engage the inwardly-facing surface of the aperture and resist or prevent rearward movement of the engagement members (i.e. removal of the anchor 2). As a load is applied to the load cable 10 via the D-ring 14, the cable crimp 12 exerts a force on the first end 4a of the main body element. This in turn tries to axially displace the main body element 4 rearwards (i.e. out of the aperture). As the engagement members 8 are unable to move rearwards, the frustoconical portion 4f exerts a greater radially outward force on each of the engagement members 8, which in turn increases the force exerted by each of the lugs 8c on the inwardly-facing surface of the aperture.

When the load has been removed and it is desired to remove the anchor 2 from the aperture, a user urges the release element 6 rearwards (i.e. towards the end cap 16). This displaces the engagement lugs 8c towards the waist portion 4g, which in turn urges the lugs 8c radially inwards. This disengages the lugs 8c from the inwardly-facing surface of the aperture and permits the removal of the anchor 2 from the aperture. The anchor 2 can then be re-used when needed.

The invention claimed is:

1. An anchor for insertion into an aperture, the anchor comprising a body element, three or four elongate engagement members, and a release element; wherein the body element has a first end and an opposed second end; the body element defines a tapered surface adjacent to a first end portion of the body element; the release element is slidably coupled to the body element; each of the engagement members has a first end via which the engagement member is coupled to the release element, and a second end which includes a radially outwardly projecting lug; the second ends of the engagement members engage the tapered surface defined by the body element; and wherein when the release element is in a release position relative to the body element, the second ends of the engagement members are engaged with a relatively narrow portion of the tapered surface and the lugs are in a radially contracted configuration; and when the release element is in an engaged position relative to the body portion, the second ends of the engagement members are engaged with a relatively wide portion of the tapered surface and the lugs are urged radially outwards from the body element by the tapered surface to form a radially expanded configuration; wherein the body element defines therein a central bore; a load cable extends through the body element central bore; the load cable defines a first end and a second end; the first end of the load cable includes a cable crimp and the cable crimp is disposed outside of the body element and engages the first end of the body element; the second end of the load cable includes a load-bearing coupling; and wherein the body defines a plurality of longitudinal channels and the engagement members are disposed within respective channels when the release element is in its release position and the engagement member lugs are in their radially contracted configuration.

2. An anchor according to claim 1, wherein the release element is biased to the engaged position.

3. An anchor according to claim 1, wherein each engagement member includes a resiliently deformable body.

4. An anchor according to claim 3, wherein each engagement member defines at one end thereof a release element coupling portion, and carries the lug at the opposite end thereof.

5. An anchor according to claim 3, wherein each engagement member body is deflected radially outwards when the release element is in its engaged position and the lugs are in their radially expanded configuration.

6. An anchor according to claim 1, wherein the body element defines a first stop element and a spaced apart second stop element and displacement of the release element relative to the body element is constrained by the first and second stop elements.

7. An anchor according to claim 1, wherein the release element defines therein a central bore and a portion of the body element extends through the central bore.

8. An anchor according to claim 1, wherein a width dimension of the tapered surface decreases in the direction of the second end of the body element such that the body element defines a waist portion at one end of the tapered surface.

9. An anchor according to claim 1, wherein the tapered surface is defined by a frustoconical portion of the body element.

10. An anchor according to claim 1, wherein the release element is substantially cylindrical; and the engagement elements are circumferentially spaced around the cylindrical release element.

* * * * *